May 22, 1934.　　　J. E. CHAMBERS　　　1,959,657
GAS BURNER
Filed Aug. 10, 1931　　　2 Sheets-Sheet 1

Inventor
JOHN E. CHAMBERS,
By
Attorneys

May 22, 1934.  J. E. CHAMBERS  1,959,657
GAS BURNER
Filed Aug. 10, 1931  2 Sheets-Sheet 2

Inventor
JOHN E. CHAMBERS,

By
Attorneys

Patented May 22, 1934

1,959,657

UNITED STATES PATENT OFFICE 1,959,657

GAS BURNER

John E. Chambers, Shelbyville, Ind., assignor to Chambers Corporation, Shelbyville, Ind., a corporation of Indiana Application August 10, 1931, Serial No. 556,236

5 Claims. (Cl. 126—214)

It it the object of my invention to increase the efficiency of a gas burner of the type commonly used in gas ranges. A further object of my invention is to provide for the elimination of the dirt tray which is usually disposed beneath the cooking top of the gas-range and to employ instead of such tray individual dirt-collectors which are removable through the cooking top. another object of my invention is to provide for the even distribution of heat to a vessel being heated over the burner and to do this without substantial loss of efficiency.

In carrying out my invention I make the burner of annular shape and provide it at angular intervals with upwardly extending bosses at the upper ends of which the gas-emission openings are located. In association with the burner, I employ a heat-concentrating ring which may be supported either from the burner or from the grid which covers the opening in the cooking top below which the burner is located. The grid which covers the opening in the cooking top above the burner has an imperforate center portion from which there extend radial arms that support the grid. Below the grid I mount an annular trough the inner diameter of which is slightly less than the diameter of the imperforate center portion of the grid.

Figure 1:
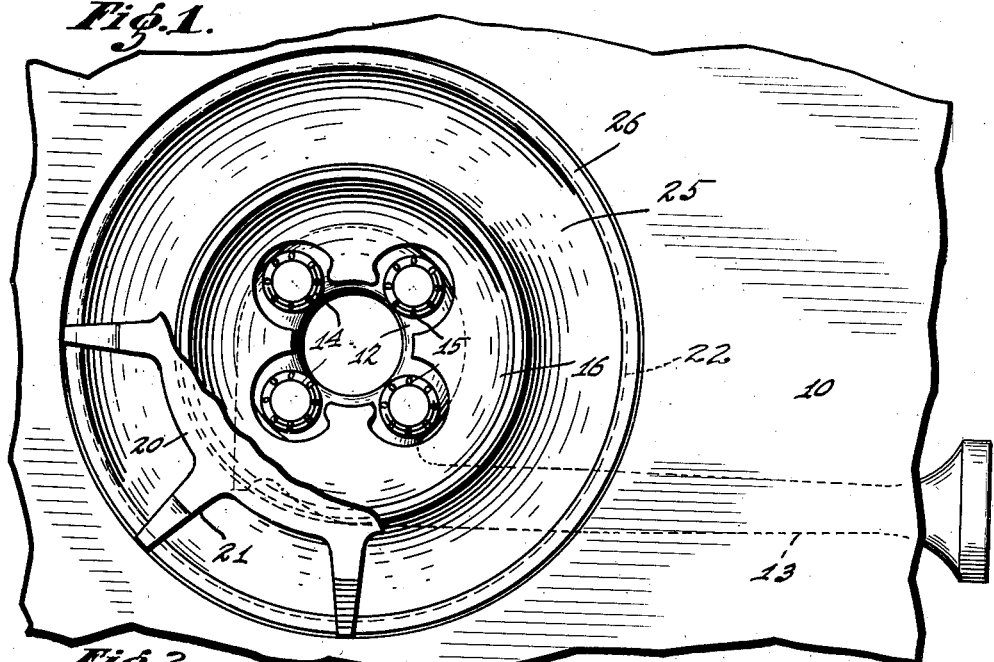
Figure 2:
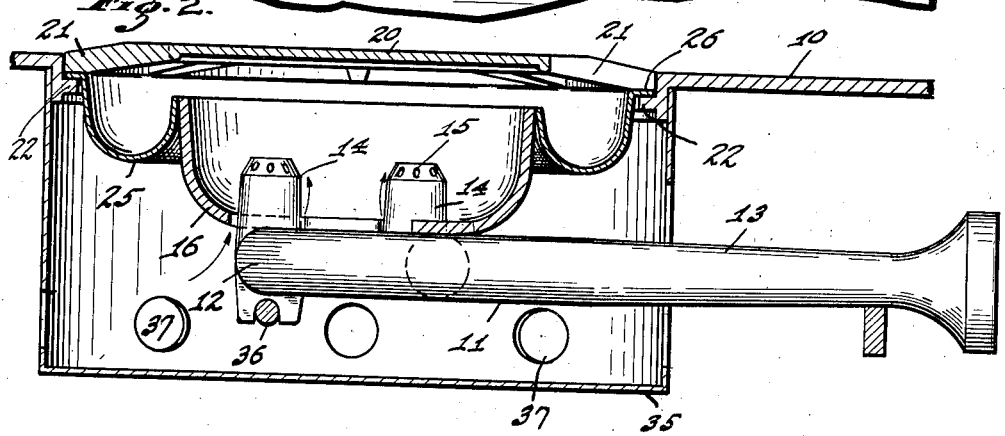
Figure 3:
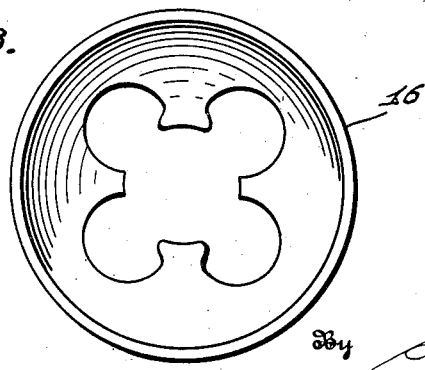
Figure 4:
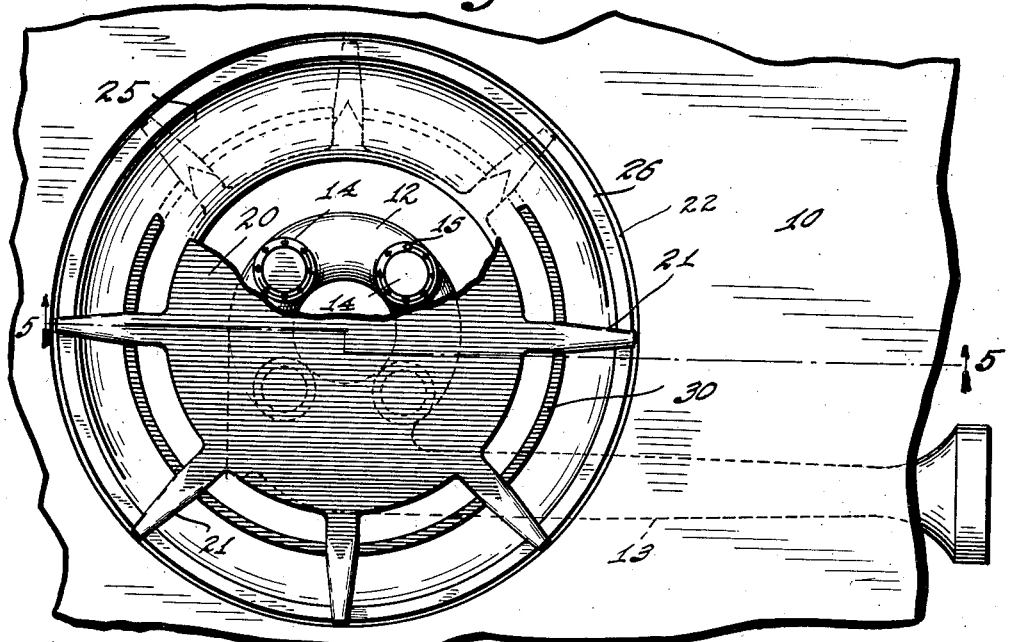
Figure 5:
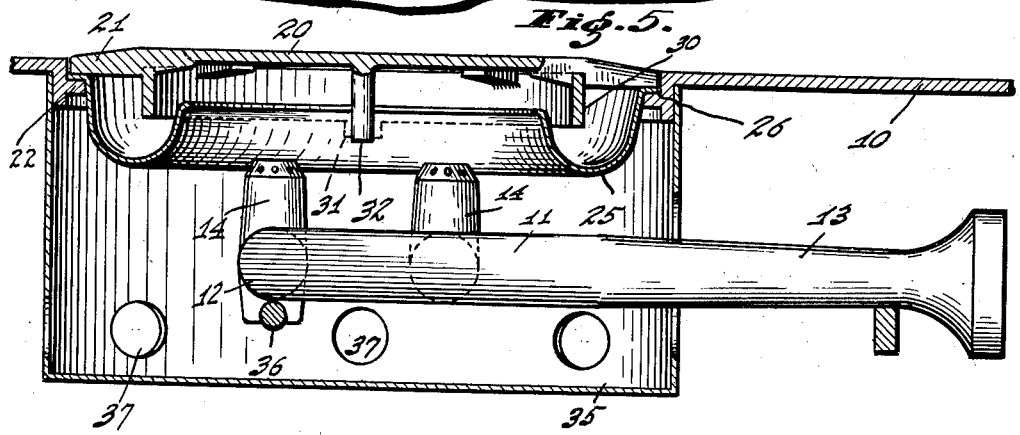
Figure 6:
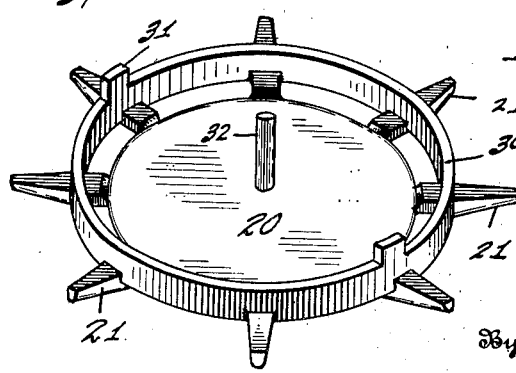

The accompanying drawings illustrate my invention: Fig. 1 is a fragmental plan of the cooking top of a gas-range showing one burner and its associated parts; Fig. 2 is a side elevation of the burner showing the associated parts in section; Fig. 3 is a plan of the heat-concentrating ring shown in Figs. 1 and 2; Fig. 4 is a view similar to Fig. 1 showing a modified form of construction; Fig. 5 is a vertical section on the line 5—5 of Fig. 4; and Fig. 6 is a perspective view illustrating an inverted position the grid employed in the construction shown in Figs. 4 and 5.

The drawings illustrate a fragment of the cooking top 10 of a gas-range, such cooking top being provided with one or more openings below each of which a burner 11 is mounted. The preferred form of burner illustrated in the drawings comprises a hollow annulus 12 adapted to receive a combustible mixture of gas and air through an integral mixture-conduit 13. At angularly spaced points, the annulus 12 is provided with upwardly extending hollow bosses 14 the upper ends of which are frustro-conical in shape. The gas-emitting openings 15 are located in the frusto-conical upper portions of the bosses 14.

I have found that a burner of the type described is compact, provides ready access for the secondary air necessary to complete combustion, and is efficient in use.

The efficiency of the burner may be increased by associating with it means for preventing the lateral dissemination of heat. The means illustrated in Figs. 1 to 3 inclusive for attaining this object comprises a bowl 16, the bottom of which is cut out to provide for the reception of the bosses 14. The opening in the bottom of the bowl 16 is so shaped as to provide between its edges and the bosses 14 spaces for the admission of secondary air to the burner.

The opening in the cooking top 10 and above the burner 11 is covered by a grid 20 which, as previously indicated, has an imperforate center portion and radially projecting arms 21. The cooking top 10 is provided below its upper surface with an annular flange 22 which provides a support for the outer ends of the radial arms 21. The imperforate center portion of the grid 20 is somewhat larger in diameter than the bowl 16 in order to prevent any dirt or material spilled from vessels being heated from falling into the bowl.

To collect any dirt or other material which falls through the spaces between the arms 21 I employ an annular trough 25 the outer edge of which is provided with a flange 26 which rests on the flange 22 of the cooking top 10. The trough 25 preferably fits comparatively closely against the periphery of the bowl 16, as is clear from Fig. 2, the top of the bowl and the inner edge of the trough being spaced from the lower surface of the grid 20 in order to permit the free passage of hot gases from the burner 11.

In the modification of my invention illustrated in Figs. 4, 5, and 6, the heat-concentrating means is in the form of a ring 30 carried by the grid 20. The ring 30 is of larger diameter than the center portion of the grid 20 and intersects the radial arms 21 at points intermediate their length. The ring 30 projects downwardly from the grid 20 into the trough 25, and thus has a marked tendency to limit the outward flow of hot gases from the burner 14 and to concentrate them against the bottom of the vessel which is supported on the grid.

In order to prevent the grid 20 from being put in place and used in inverted position, I may provide the ring 30 with diametrically opposite, downwardly projecting lugs 31 and the center portion of the grid 20 with a downwardly projecting pin 32 disposed in a central position. Should the grid be put in place in inverted position, as illustrated, in Fig. 6, the lugs 31 and pin 32 will prevent a vessel from being positioned over the grid.

The imperforate center portion of the grid tends to distribute heat evenly over the bottom of a vessel resting upon it. It also tends to spread the hot gases arising from the burner and therefore to cause their lateral dissemination, but this latter tendency is offset to a large extent by the heat-concentrating ring.

The burner 11 is conveniently located in a burner box 35, being supported therein by means of a transversely extending rod 36. The burner box is provided at intervals around its circumference with openings 37 for the admission of the secondary air necessary to complete combustion.

I claim as my invention:—

1. In a gas range having a cooking top provided with an opening, a burner located below said opening, said burner comprising a hollow annulus having at angular intervals upwardly projecting bosses, said bosses being provided with fuel emission openings, a grid covering the opening in the cooking top, said grid having an imperforate center portion and an annular series of openings about its periphery, and a removable annular trough located in the opening in said cooking top below the grid, said trough having an internal diameter less than that of the central portion of said grid.

2. In a gas range having a cooking top provided with an opening, a burner located below said opening, a grid covering the opening in the cooking top, said grid having an imperforate center portion and an annular series of openings about its periphery, and a removable annular trough located in the opening in said cooking top below the grid, said trough having an internal diameter less than that of the central portion of said grid.

3. In a gas range having a cooking top provided with an opening, a burner located below said opening, said burner comprising a hollow annulus having at angular intervals upwardly projecting bosses, said bosses being provided with fuel emission openings, a grid covering the opening in the cooking top, said grid having an imperforate center portion and gas-passing openings near its edge, and a heat-concentrating ring opposing lateral spread of the gases from said burner.

4. In a gas range having a cooking top provided with an opening, a burner located below said opening, said burner comprising a hollow annulus having at angular intervals upwardly projecting bosses, said bosses being provided with fuel emission openings, a grid covering the opening in the cooking top, said grid having an imperforate center portion and gas-passing openings near its edge, and a heat-concentrating ring opposing lateral spread of the gases from said burner, said ring being carried by said grid and having a diameter such that it crosses such gas-passing openings.

5. In a gas range having a cooking top provided with an opening, a burner located below said opening, a grid covering the opening in the cooking top, said grid having an imperforate center portion and gas-passing openings near its edge, and a heat-concentrating ring opposing lateral spread of the gases from said burner.

JOHN E. CHAMBERS.